G. F. PURRINGTON.
COOKING APPARATUS.
APPLICATION FILED MAR. 27, 1920.
1,368,351.
Patented Feb. 15, 1921.
3 SHEETS—SHEET 3.
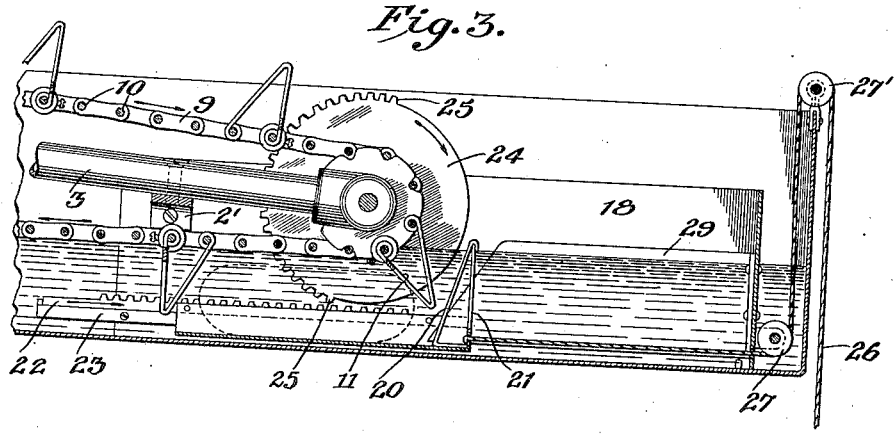
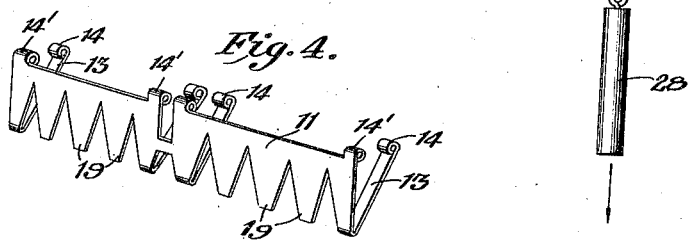
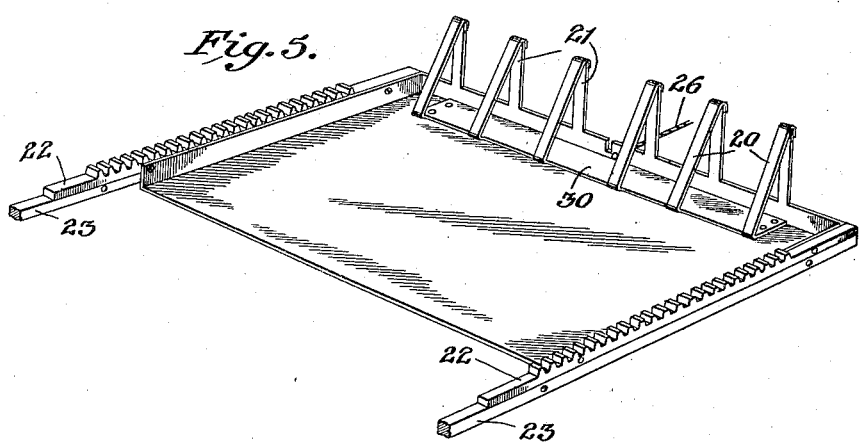
Inventor
George F. Purrington
By Mason Fenwick & Lawrence,
Attorneys

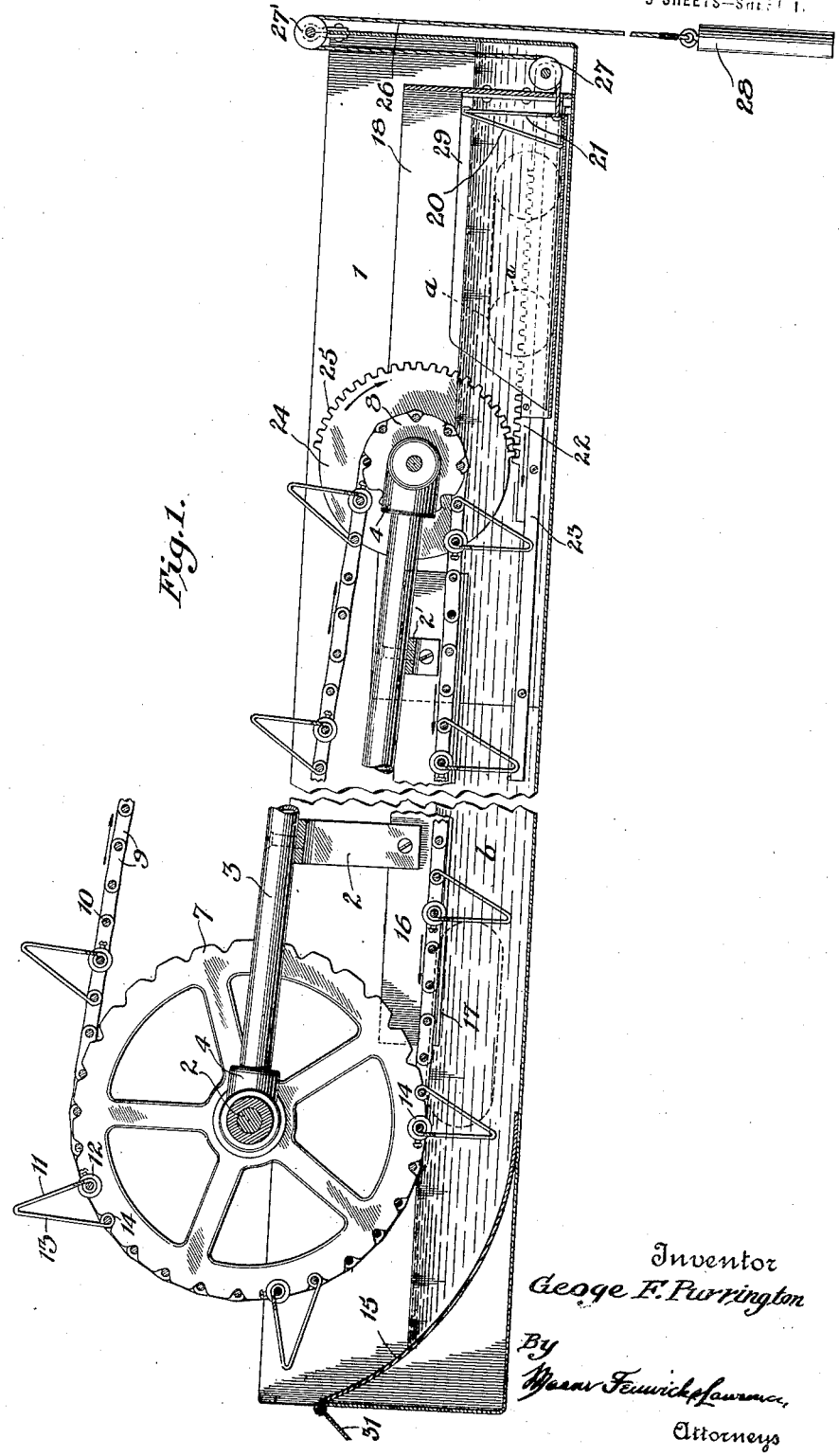

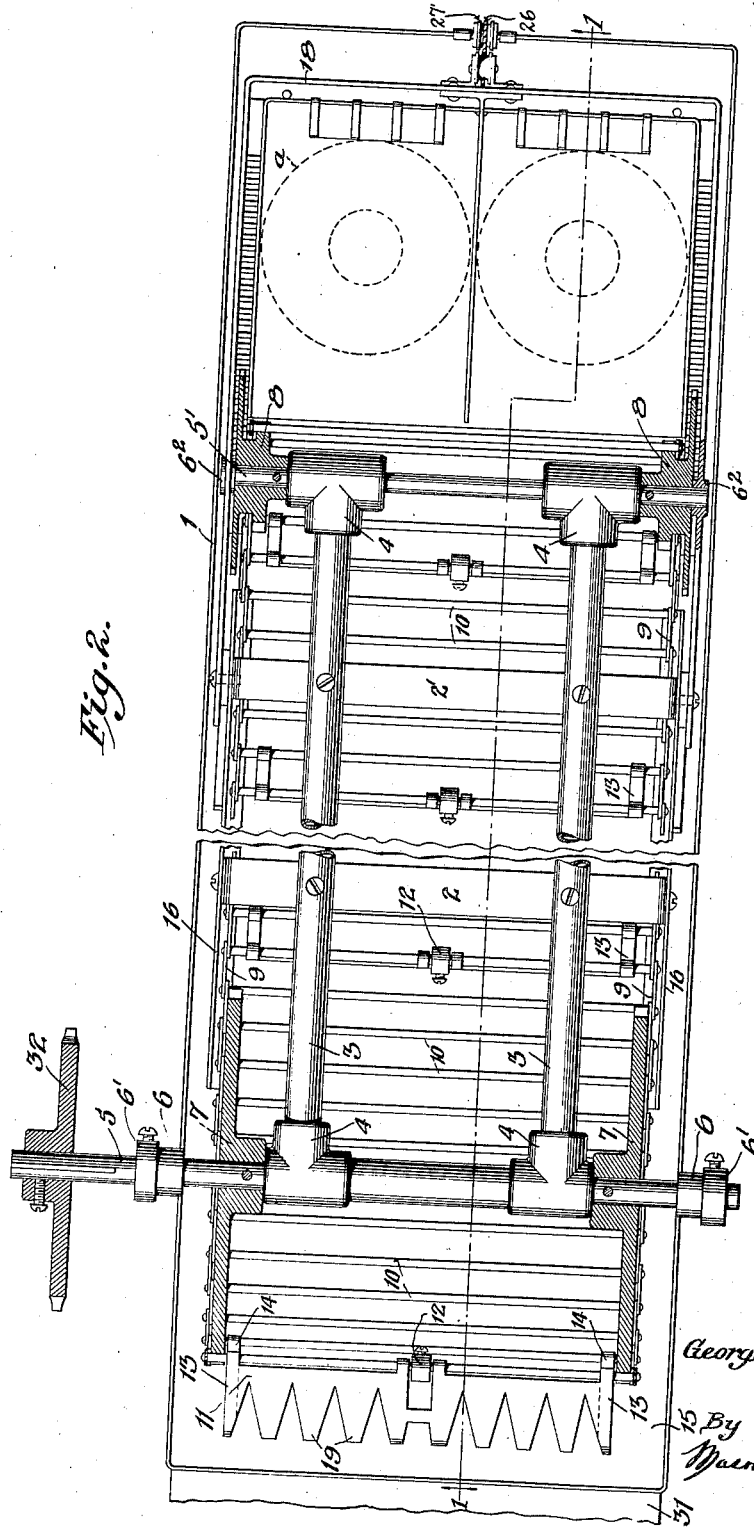

UNITED STATES PATENT OFFICE.

GEORGE F. PURRINGTON, OF MATTAPOISETT, MASSACHUSETTS.

COOKING APPARATUS.

1,368,351.   Specification of Letters Patent.   Patented Feb. 15, 1921.

Application filed March 27, 1920. Serial No. 369,344.

*To all whom it may concern:*

Be it known that I, GEORGE F. PURRINGTON, a citizen of the United States, residing at Mattapoisett, in the couny of Plymouth and State of Massachusetts, have invented certain new and useful Improvements in Cooking Apparatus; and I do hereby declare the following to be a full, clear, and exact description of the invention, such as will enable others skilled in the art to which it appertains to make and use the same.

This invention relates to a machine for cooking of doughnuts, crullers, potatoes, or other articles of food by submerging same in hot oil or grease.

The object of the invention is to provide a simple and efficient machine by means of which the process can be performed automatically, with greater accuracy, precision and rapidity and under more comfortable and sanitary conditions for the cook or operator.

The invention consists in the machine comprising the novel structure and combination of parts hereinafter more fully described and claimed.

Three sheets of drawings accompany this specification as a part thereof, in which like reference characters denote like parts throughout.

Figure 1 is a side sectional view of the device.

Fig. 2 is a plan view with certain parts shown in section.

Fig. 3 is a side sectional view of one end of the device showing the carriage in its forward position.

Fig. 4 is a perspective view of a drag member removed from the machine.

Fig. 5 is a perspective view of the carriage and the slides therefor, removed from the machine.

Referring to the drawings, the machine shown, adapted to handling two doughnuts at a time, comprises a substantially rectangular grease pan, of a depth sufficient to hold a suitable quantity of oil or grease, and to allow a reasonable clearance for the operation of the mechanism above the oil. Within the pan 1, and attached thereto at one end, is a U-shaped yoke member 18 carrying on the inner sides of its legs guide bars 23, and having a central partition 29, and a transverse bridge member 2'. Near the end of pan 1, bearings 6—6 are provided on each side, and in the bottom is secured a concave guide plate 15.

In the bearings 6—6 is mounted a shaft 5 provided with guide collars 6'—6' and a driving sprocket 32, and carrying over and within pan 1, and on each side, sprocket wheels 7—7, suitably keyed or pinned to said shaft. Longitudinal frame members 3—3 are provided at each end with T bearing members 4—4—4—4 and these members are supported at one end on shaft 5. These frame members 3—3 are also attached to bridge member 2' and are supported thereby and in turn support bridge member 2. Guide members 16 are supported from bridge member 2. A shaft 5' is mounted in the T bearings 4—4 on the opposite ends of frame members 3—3 and supported thereby. On each end of shaft 5' are mounted the sprockets 8—8 and gear wheels 24, the latter having teeth 25, on half of their circumference as shown in Figs. 1 and 3.

An endless chain ladder composed of links 9 and transverse bars 10 is mounted on and carried by the sprockets 7—7 and 8—8. On this endless chain are mounted drag members 11 spaced a little more than a doughnut's diameter apart, and comprising fingers 19 and braces 13 secured to the bars 10 by overturned portions 14 and 14' and secured against transverse movement by collars 12.

A carriage having a drag member 30 comprising fingers 20 and 21 and two parallel rack bars 22—22 adapted to slide on guides 23 within yoke 18 is provided with a cord 26 which passes through a hole in the back of yoke 18 under a guide wheel 27 attached thereto and up and over a guide wheel 27' mounted on the rim of the pan 9 and has a suitable weight 28 attached to its end.

The partially toothed gears 24 are adapted to engage the rack bars 22 as shown in Fig. 1, and to carry same forward until the last of teeth 25 passes out of engagement as shown in Fig. 3, whereupon the carriage is released and the weight 28 operates to withdraw the carriage to its original position at the rear of the pan 1.

In operation the doughnuts —a— are placed in the carriage as indicated in Figs. 1 and 2. Power applied to the sprocket 32 rotates sprockets 7—7 and 8—8 by means of the endless chain ladder and when gears 24 have rotated sufficiently their teeth 25 engage rack bars 22 and advance the carriage with the doughnuts, the doughnuts being held by the fingers 20, between which the oil passes freely. When the carriage reaches its forward position a drag member 11 mounted on the endless chain interposes and sweeps the doughnuts —a— forward off of the carriage. At the same time the last of the teeth 25, is lifted from the rack bars 22 and the carriage is withdrawn for a new load.

The doughnut —a— is then carried continuously forward by drag 11, the oil passing freely between fingers 19 and held uniformly down by the bars 10 and at the forward end of pan 1 is raised over the concave guide 15 and thrown out of pan 1 onto some suitable chute 31. The doughnuts or other articles normally sink when first placed in the hot oil but become buoyant at the point when the chain carrier supersedes the carriage.

The proportions of the device as well as the speed of operation can be readily adjusted in conjunction with the temperature of the oil to allow the proper periods for the various stages of the operation, by means of which the articles placed in the machine, uncooked, will be expelled thoroughly and properly cooked in all respects. By retaining the naturally buoyant articles submerged in the oil there is no necessity for turning and this operation in the ordinary domestic process is entirely eliminated.

It will be obvious that many variations and modifications in the form and structure of the device adapted to the character of the particular articles to be cooked or the number to be cooked in any operation, will suggest themselves to those skilled in the art, and will be embraced within the general scope of this invention.

What I claim is:

1. A machine for cooking doughnuts and the like comprising an open container for hot oil, a receiver slidably mounted in the container in submerged relation to the oil, and means for removing the doughnuts from the receiver and carrying them through and in submerged relation to the oil.

2. A machine for cooking articles in a bath of oil or grease, comprising an open container for the hot oil, a receiver slidably mounted in said container, and means for removing the articles to be cooked from said receiver and carrying them through and in submerged relation to said bath and discharging said articles from said bath and container when cooked.

3. A machine for cooking articles in a bath of hot oil or grease, comprising an open container, a conveyer in said container, and reciprocating means within said container for delivering the articles into engagement with the under side of said conveyer.

4. A machine for cooking articles in a bath of hot oil or grease, comprising a container, a conveyer operating horizontally in said container, and means for delivering the articles into engagement with the under side of said conveyer comprising a sliding carriage.

5. A machine for cooking articles in a bath of hot oil or grease, comprising a container, a conveyer comprising a plurality of links and transverse rods and forming an endless chain ladder operating horizontally in said container and the cooking bath and means for delivering the articles into engagement with the under side of said conveyer comprising a sliding carriage.

6. A machine for cooking articles in a bath of hot oil or grease, comprising a container, a conveyer, comprising a plurality of links and transverse rods and forming an endless chain ladder operating horizontally in said container and the cooking bath and means for delivering the articles into engagement with the under side of said conveyer comprising a sliding carriage, and means for operating said conveyer and said slidable carriage to properly coördinate their operations.

7. In a device for cooking articles in a bath of hot oil or grease the combination of an endless conveyer, carried on sprockets affixed to shafts, gears affixed to one of said shafts, having teeth cut on one half of their circumference, and a slidable carriage having rack-bars adapted to be engaged by the teeth of said gears but to slide freely under the untoothed parts thereof, and means for withdrawing said carriage when thus released.

8. In a device for cooking articles in a bath of hot oil or grease, the combination of an endless conveyer comprising a plurality of links and transverse bars and carried on sprockets affixed to shafts, gears affixed to one of said shafts having teeth cut on one half of their circumference, and a slidable carriage having rack-bars adapted to be engaged by the teeth of said gears but to slide freely under the untoothed parts thereof, and means for withdrawing said carriage when thus released.

9. In a device for cooking articles in a bath of hot oil or grease, the combination of an endless conveyer, comprising a plurality of links and transverse bars, and having drags affixed perpendicularly thereto at spaced distances, said conveyer carried on sprockets affixed to shafts, gears affixed to one of said shafts, having teeth on half of their circumference, and a slidable carriage having rack-bars adapted to be engaged by the teeth of said gears but to slide freely under the untoothed parts thereof, and means for withdrawing said carriage when thus released.

10. In a device for cooking articles in a bath of hot oil or grease, the combination of an endless conveyer carried on sprockets affixed to shafts, gears affixed to one of said shafts, having teeth cut on one half of their circumference, and a slidable carriage having a drag member and rack-bars adapted to be engaged by the teeth of said gears but to slide freely under the untoothed parts thereof, and means for withdrawing said carriage when thus released.

11. In a device for cooking articles in a bath of hot oil or grease, the combination of an endless conveyer comprising a plurality of links and transverse bars and having drags affixed perpendicularly thereto at spaced distances, said conveyer carried on sprockets affixed to shafts, gears affixed to one of said shafts, having teeth cut on half of their circumference, and a slidable carriage having a drag member and rack-bars adapted to be engaged by the teeth of said gears, but to slide freely under the untoothed parts thereof, and means for withdrawing said carriage when thus released.

In testimony whereof I affix my signature in presence of two witnesses.

GEORGE F. PURRINGTON.

Witnesses:
EDITH M. FERGUSON,
LEMUEL LE BARON DEXTER.